(12) United States Patent
Zhang et al.

(10) Patent No.: US 11,928,884 B2
(45) Date of Patent: Mar. 12, 2024

(54) FINGERPRINT COLLECTION METHOD AND TERMINAL

(71) Applicant: Huawei Technologies Co., Ltd., Shenzhen (CN)

(72) Inventors: Dapeng Zhang, Wuhan (CN); Feipeng Shang, Shenzhen (CN); Zhaofeng Li, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/213,984

(22) Filed: Mar. 26, 2021

(65) Prior Publication Data

US 2021/0286966 A1    Sep. 16, 2021

Related U.S. Application Data

(63) Continuation of application No. 16/340,316, filed as application No. PCT/CN2017/081518 on Apr. 21, 2017, now Pat. No. 10,977,474.

(30) Foreign Application Priority Data

Oct. 8, 2016   (CN) .......................... 201610882606.1
Dec. 14, 2016  (WO) ................ PCT/CN2016/109839

(51) Int. Cl.
  *G06V 40/13*     (2022.01)
  *G06F 21/32*     (2013.01)
      (Continued)

(52) U.S. Cl.
  CPC .......... *G06V 40/1318* (2022.01); *G06F 21/32* (2013.01); *G06F 21/74* (2013.01);
      (Continued)

(58) Field of Classification Search
  CPC ............. G06K 9/0004; G06K 9/00067; G06K 9/00006; G06K 9/0008; G06F 21/74; G06F 21/32; H04L 9/3231; H04L 63/0861
  See application file for complete search history.

(56) References Cited

U.S. PATENT DOCUMENTS

2008/0057999 A1   3/2008  Lhotak
2008/0172715 A1   7/2008  Geiger et al.
         (Continued)

FOREIGN PATENT DOCUMENTS

CN      101046715 A    10/2007
CN      102662603 A     9/2012
         (Continued)

*Primary Examiner* — Jonathan A Boyd
(74) *Attorney, Agent, or Firm* — Conley Rose, P.C.

(57) ABSTRACT

The present disclosure provides a fingerprint collection method. When a fingerprint sensor is integrated on any function key of a terminal, a failure of a fingerprint application function that is caused when a user unintentionally operates a function key can be avoided. The method includes: obtaining, by a terminal, a fingerprint collection instruction, where the fingerprint collection instruction is used to instruct to collect a fingerprint by using a fingerprint sensor integrated on a function key; collecting, by the terminal by using the fingerprint sensor based on the fingerprint collection instruction, fingerprint information recorded by a user on the function key; obtaining, by the terminal on the function key at any moment of collecting the fingerprint information, a first key event triggered by the user, where the first key event is any operation other than a fingerprint recording event; and discarding, by the terminal, the first key event.

20 Claims, 10 Drawing Sheets

(51) Int. Cl.
  *G06F 21/74* (2013.01)
  *G06V 40/12* (2022.01)
  *H04L 9/32* (2006.01)
  *H04L 9/40* (2022.01)

(52) U.S. Cl.
  CPC ........ *G06V 40/1347* (2022.01); *H04L 9/3231* (2013.01); *H04L 63/0861* (2013.01); *G06V 40/12* (2022.01)

(56) References Cited

U.S. PATENT DOCUMENTS

| | | | |
|---|---|---|---|
| 2011/0128231 A1 | 6/2011 | Mizumoto et al. | |
| 2011/0300829 A1* | 12/2011 | Nurmi | H04L 9/3231 455/411 |
| 2013/0257740 A1 | 10/2013 | You et al. | |
| 2015/0070301 A1 | 3/2015 | Chia et al. | |
| 2015/0074615 A1* | 3/2015 | Han | H04L 63/105 715/863 |
| 2016/0196462 A1 | 7/2016 | Jiang et al. | |
| 2016/0196463 A1 | 7/2016 | Jiang et al. | |
| 2016/0314291 A1* | 10/2016 | de Luna | G06F 9/452 |
| 2017/0060259 A1 | 3/2017 | Yang et al. | |
| 2017/0060518 A1* | 3/2017 | Hong | G06F 3/1423 |
| 2017/0228123 A1 | 8/2017 | Ghassabian | |

FOREIGN PATENT DOCUMENTS

| | | |
|---|---|---|
| CN | 104143092 A | 11/2014 |
| CN | 104320509 A | 1/2015 |
| CN | 104732201 A | 6/2015 |
| CN | 104917894 A | 9/2015 |
| CN | 105117631 A | 12/2015 |
| CN | 105303088 A | 2/2016 |
| CN | 105554305 A | 5/2016 |
| CN | 105653171 A | 6/2016 |
| CN | 105843525 A | 8/2016 |
| CN | 105893807 A | 8/2016 |
| CN | 105975304 A | 9/2016 |
| IN | 105898418 A | 8/2016 |
| JP | 2009048418 A | 3/2009 |
| JP | 2011114460 A | 6/2011 |
| WO | 2014143065 A1 | 9/2014 |

* cited by examiner

FINGERPRINT COLLECTION METHOD AND TERMINAL

CROSS-REFERENCE TO RELATED APPLICATIONS

This application is a continuation of U.S. patent application Ser. No. 16/340,316, filed on Apr. 8, 2019, which is a U.S. National Stage of International Patent Application No. PCT/CN2017/081518 filed on Apr. 21, 2017, which claims priority to International Patent Application No. PCT/CN2016/109839 filed on Dec. 14, 2016 and Chinese Patent Application No. 201610882606.1 filed on Oct. 8, 2016. All of the aforementioned patent applications are hereby incorporated by reference in their entireties.

TECHNICAL FIELD

The present disclosure relates to the field of communications technologies, and in particular, to a fingerprint collection method and a terminal.

BACKGROUND

Currently, many applications (APP, Application) can implement various fingerprint application functions that are based on fingerprint authentication, for example, fingerprint payment and fingerprint unlock. A core principle of the fingerprint application functions is: authenticating a collected fingerprint of a user, and performing a corresponding application function after an identity of the user is determined based on an authentication result.

To implement the foregoing fingerprint application functions, a fingerprint sensor (that is, fingerprint sensor) needs to be disposed on a terminal, and a fingerprint of a user is collected by using the fingerprint sensor. The fingerprint sensor may be integrated on any function key of the terminal, for example, a power key, a home key, or a volume key. The power key is used as an example. When the fingerprint sensor is integrated on the power key, the user not only can implement a lock screen or wakeup function of the terminal by pressing the power key but also can implement a corresponding fingerprint application function by collecting the fingerprint of the user by using the fingerprint sensor on the power key.

In this case, when a fingerprint application function is performed, for example, when a fingerprint payment function is enabled to collect a fingerprint of a user, once the user accidentally presses the power key and triggers a lock screen operation, the terminal switches to a lock screen state. In this case, a fingerprint payment procedure that is being performed is forced to be interrupted, and the fingerprint payment function cannot be completed.

SUMMARY

Embodiments of the present disclosure provide a fingerprint collection method and a terminal. When a fingerprint sensor is integrated on any function key of a terminal, a failure of a fingerprint application function that is caused when a user unintentionally operates a function key can be avoided.

To achieve the foregoing objective, the following technical solutions are used in the embodiments of the present disclosure.

According to a first aspect, an embodiment of the present disclosure provides a fingerprint collection method, including: obtaining, by a terminal, a fingerprint collection instruction, where the fingerprint collection instruction is used to instruct to collect a fingerprint by using a fingerprint sensor integrated on a function key; collecting, by the terminal by using the fingerprint sensor based on the fingerprint collection instruction, fingerprint information recorded by a user on the function key; and obtaining, by the terminal on the function key at any moment of collecting the fingerprint information, a first key event triggered by the user, where the first key event is any operation other than a fingerprint recording event. In this case, the terminal may discard the first key event. That is, in a process of collecting the fingerprint information of the user, a related function of the function key may be temporarily disabled. In this way, when the fingerprint sensor is integrated on the function key, the related function of the function key does not interfere in the process of collecting the fingerprint information, thereby avoiding a problem that a fingerprint application function related to a fingerprint collection process cannot be performed any longer.

In a possible design, the discarding, by the terminal, the first key event includes: determining, by the terminal, a priority of the first key event and a priority of collecting the fingerprint information; and discarding, by the terminal, the first key event if the priority of collecting the fingerprint information is higher than the priority of the first key event. Therefore, mutual interference between an original function of the function key and a fingerprint collection function can be avoided in different application scenarios.

In a possible design, the function key has a corresponding key status, and the key status is used to indicate that the function key is in a locked state or an unlocked state. After the obtaining, by a terminal, a fingerprint collection instruction, the method further includes: setting, by the terminal, the key status of the function key to the locked state. In this way, after a fingerprint drive module of the terminal obtains the fingerprint collection instruction, the key status of the function key may be set to the locked state, so as to ensure that each related function of the function key is disabled in the subsequent fingerprint collection process.

In a possible design, the discarding, by the terminal, the first key event includes: generating, by the terminal based on the first key event, a first operation instruction corresponding to the first key event; determining, by the terminal, that a status of the foregoing key status bit is the locked state; and further, discarding the first operation instruction.

In a possible design, the method further includes: setting, by the terminal, the key status to the unlocked state after the fingerprint information of the user is collected, so that the related function of the function key returns to normal.

In a possible design, after the obtaining, by the terminal on the function key, a first key event triggered by the user, the method further includes: generating, by the terminal based on the first key event, a first operation instruction corresponding to the first key event; and storing, by the terminal, the first operation instruction. After the setting, by the terminal, the key status to the unlocked state, the method further includes: executing, by the terminal, the first operation instruction. That is, after setting the key status to the unlocked state, the terminal may further execute the first operation instruction. In this way, the terminal not only can be prevented from being interfered by the original function of the function key in the fingerprint collection process but also can complete the first key event triggered by the user.

In a possible design, after the setting, by the terminal, the key status bit to an unlocked state, the method further includes: obtaining a second key event triggered by the user on the function key; and generating, by the terminal based on the second key event, a second operation instruction corresponding to the second key event. Further, when determining that the status of the key status bit is the unlocked state, the terminal can directly execute the second operation instruction.

In a possible design, the obtaining, by a terminal, a fingerprint collection instruction includes: generating, by the terminal, the fingerprint collection instruction if it is detected that the user triggers a fingerprint application function in a target application.

According to a second aspect, an embodiment of the present disclosure provides a fingerprint collection method, including: obtaining, by a terminal, a fingerprint collection instruction, where the fingerprint collection instruction is used to instruct to collect a fingerprint by using a fingerprint sensor integrated on a function key; collecting, by the terminal by using the fingerprint sensor based on the fingerprint collection instruction, fingerprint information recorded by a user on the function key; obtaining, by the terminal on the function key at any moment of collecting the fingerprint information, a key operation triggered by the user; and determining, by the terminal based on key duration of the key operation, whether to discard the key operation, that is, determining whether the key operation is an accidental touch operation, so as to avoid a conflict with an original key function of the function key in a fingerprint collection process.

In a possible design, the determining, by the terminal based on key duration of the key operation, whether to discard the key operation includes: When the key duration of the key operation is shorter than first preset duration, because the key duration is relatively short, it may be considered that the key operation is accidentally performed by the user. That is, the intention of the user in this case still is performing the fingerprint collection function on the function key instead of performing the original key function of the function key. Therefore, the terminal may discard the key operation, thereby implementing a foolproof touch function.

In a possible design, the method further includes: when the key duration of the key operation is longer than the first preset duration and shorter than second preset duration, where the key operation may be considered as an effective short press operation, performing, by the terminal, an operation instruction corresponding to the short press operation; and when the key duration of the key operation is longer than the second preset duration, where the key operation may be considered as an effective long press operation, performing, by the terminal, an operation instruction corresponding to the long press operation.

In a possible design, the method further includes: adjusting, by the terminal, a value of the first preset duration based on a current application scenario.

In a possible design, after the collecting, by the terminal by using the fingerprint sensor based on the fingerprint collection instruction, fingerprint information recorded by a user on the function key, the method further includes:
authenticating, by the terminal, an identity of the user by using the collected fingerprint information.

According to a third aspect, an embodiment of the present disclosure provides a terminal, including: an obtaining unit, configured to obtain a fingerprint collection instruction, where the fingerprint collection instruction is used to instruct to collect a fingerprint by using a fingerprint sensor integrated on a function key; a collection unit, configured to collect, by using the fingerprint sensor based on the fingerprint collection instruction, fingerprint information recorded by a user on the function key, where the obtaining unit is further configured to obtain, by the terminal on the function key at any moment of collecting the fingerprint information, a first key event triggered by the user, where the first key event is any operation other than a fingerprint recording event; and a shielding unit, configured to discard the first key event.

In a possible design, the shielding unit is specifically configured to: determine a priority of the first key event and a priority of collecting the fingerprint information; and discard the first key event if the priority of collecting the fingerprint information is higher than the priority of the first key event.

In a possible design, the function key has a corresponding key status, and the key status is used to indicate that the function key is in a locked state or an unlocked state. The terminal further includes a setting unit, configured to set a key status bit of the function key to a locked state.

In a possible design, the shielding unit is specifically configured to: generate, based on the first key event, a first operation instruction corresponding to the first key event; determine that a status of the key status bit is the locked state; and discard the first operation instruction.

In a possible design, the setting unit is further configured to set, by the terminal, the key status bit to an unlocked state after the fingerprint information of the user is collected.

In a possible design, the terminal further includes an execution unit, configured to: generate, based on the first key event, a first operation instruction corresponding to the first key event; store the first operation instruction; and execute the first operation instruction.

In a possible design, the obtaining unit is further configured to obtain a second key event triggered by the user on the function key. The second key event is the same as or different from the first key event. The execution unit is further configured to: generate, based on the second key event, a second operation instruction corresponding to the second key event; determine that the key status bit is the unlocked state; and execute the second operation instruction.

In a possible design, the obtaining unit is specifically configured to generate the fingerprint collection instruction if it is detected that the user triggers a fingerprint application function in a target application.

According to a fourth aspect, an embodiment of the present disclosure provides a terminal, including: an obtaining unit, configured to obtain a fingerprint collection instruction, where the fingerprint collection instruction is used to instruct to collect a fingerprint by using a fingerprint sensor integrated on a function key; a collection unit, configured to collect, by using the fingerprint sensor based on the fingerprint collection instruction, fingerprint information recorded by a user on the function key, where the obtaining unit is further configured to obtain, by the terminal on the function key at any moment of collecting the fingerprint information, a key operation triggered by the user; and a determining unit, configured to determine, based on key duration of the key operation, whether to discard the key operation.

In a possible design, the determining unit is specifically configured to discard the key operation when the key duration of the key operation is shorter than first preset duration.

In a possible design, the terminal further includes an execution unit, configured to: execute an operation instruction corresponding to a short press operation when the key duration of the key operation is longer than the first preset duration and shorter than second preset duration; and execute an operation instruction corresponding to a long press operation when the key duration of the key operation is longer than the second preset duration. The second preset duration is longer than the first preset duration.

In a possible design, the execution unit is further configured to adjust a value of the first preset duration based on a current application scenario of the terminal.

In a possible design, the execution unit is further configured to authenticate an identity of the user by using the collected fingerprint information.

According to a fifth aspect, an embodiment of the present disclosure provides a terminal, including a processor, a memory, a bus, and a communications interface. The memory is configured to store a computer executable instruction, the processor is connected to the memory by using the bus, and when the terminal runs, the processor executes the computer executable instruction stored in the memory, to cause the terminal to perform the fingerprint collection method according to any one of the foregoing designs.

According to a sixth aspect, an embodiment of the present disclosure provides a computer storage medium, configured to store a computer software instruction used by the foregoing terminal. The computer storage medium includes a program designed for the terminal for executing the foregoing aspects.

According to a seventh aspect, an embodiment of the present disclosure provides a computer program. The computer program includes an instruction. The computer program, when executed by a computer, causes the computer to perform the fingerprint collection method according to any one of the designs of the first aspect.

In the embodiments of the present disclosure, the name of the terminal does not constitute a limitation to devices or functional modules. During actual implementation, the devices or the functional modules may exist with other names. The devices or the functional modules fall within the scope of the following claims of the present disclosure and their equivalent technologies provided that functions of the devices or the functional modules are similar to functions of devices or functional modules in the present disclosure.

In addition, for technical effects of any one of the designs of the second aspect to the seventh aspect, refer to technical effects of different designs of the first aspect. Details are not described herein again.

These aspects or other aspects in the present disclosure are more concise and easily understandable in descriptions in the following embodiments.

DESCRIPTION OF EMBODIMENTS

The terms "first" and "second" below are merely intended for a purpose of description, and shall not be understood as an indication or implication of relative importance or implicit indication of a quantity of indicated technical features. Therefore, a feature limited by "first" or "second" may explicitly or implicitly include one or more features. In descriptions of embodiments of the present disclosure, unless otherwise stated, "a plurality of" means two or more.

An embodiment of the present disclosure provides a fingerprint collection method that may be applied to any terminal having a fingerprint collection function. The terminal may be a mobile phone, a tablet computer, a notebook computer, a UMPC (Ultra-mobile Personal Computer, ultra-mobile personal computer), a netbook, a PDA (Personal Digital Assistant, personal digital assistant), or the like. This is not limited in this embodiment of the present disclosure.

Figure 1:
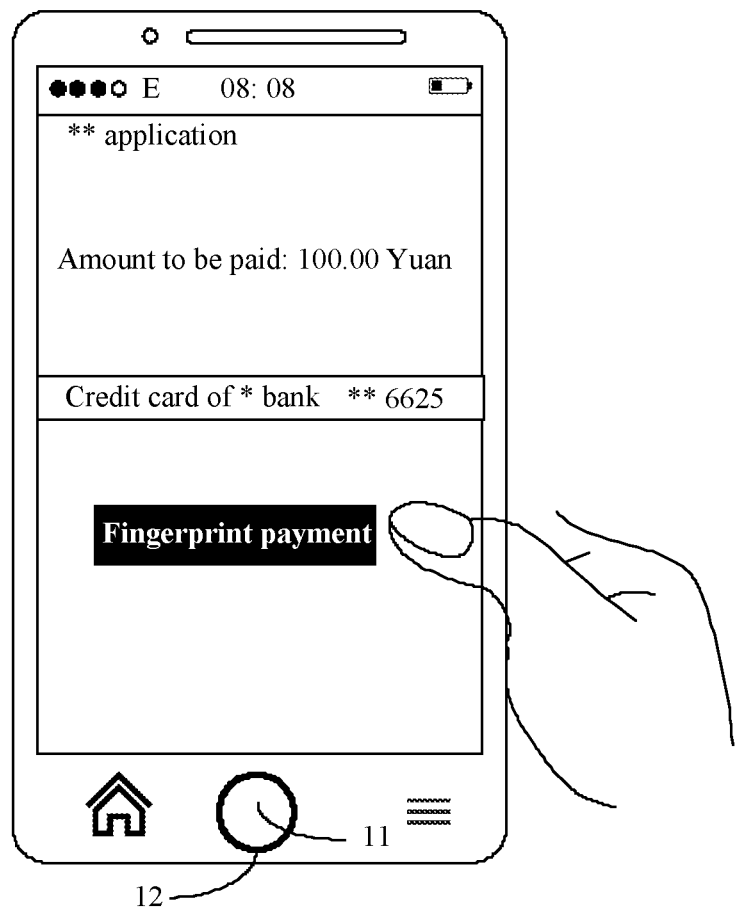
FIG. 1 is a first schematic diagram of an application scenario of a terminal according to an embodiment of the present disclosure.

As shown in FIG. 1, a mobile phone 100 is used as an example. In the fingerprint collection method provided in this embodiment of the present disclosure, a fingerprint sensor 11 may be integrated on any function key of the mobile phone, for example, a power key 12, a home key, or a volume adjustment key. The function key may be a physical key or a virtual key. This is not limited in this embodiment of the present disclosure.

Figure 2:
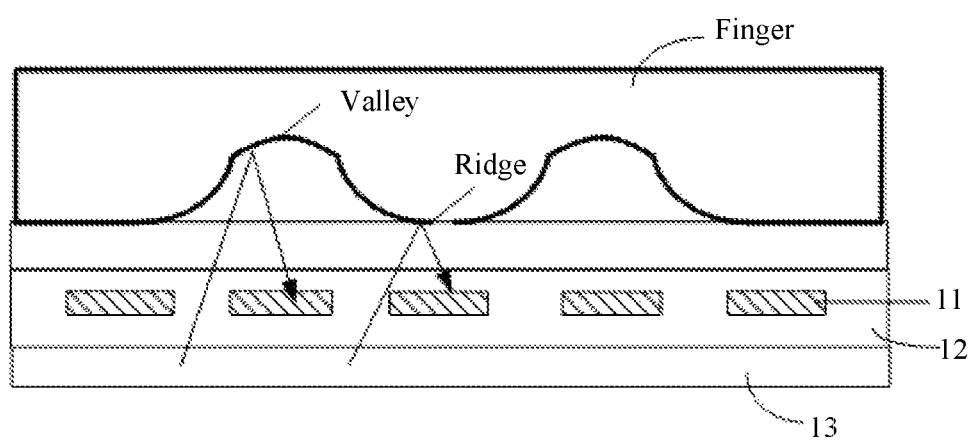
FIG. 2 is a sectional view of a power key integrating a fingerprint sensor according to an embodiment of the present disclosure.

Using an optical fingerprint identification technology as an example, the fingerprint sensor 11 may be specifically formed by a photosensitive diode or a phototransistor. As shown in FIG. 2, FIG. 2 is a sectional view of the power key 12. A plurality of fingerprint sensors 11 may be integrated on the power key 12. A backlight source 13 is a surface light source, and light emitted from the backlight source 13 is diffusely reflected after being irradiated on a finger. A part of the light is received by the fingerprint sensors 11. The fingerprint sensors 11 convert received optical signals into corresponding electrical signals. The light is reflected when passing through a wave trough (referred to as a valley subsequently) and a wave peak (referred to as a ridge subsequently) of a fingerprint, and light energy of the reflected light differs. Usually, light energy obtained after light is reflected at a valley is lower than light energy obtained after the light is reflected at a ridge. Based on such a difference, values of voltages or currents output by the fingerprint sensors 11 at different locations are different. Further, relative locations of the valley and the ridge of the fingerprint are identified, so as to obtain fingerprint information of a user.

It should be noted that in this embodiment, the optical fingerprint identification technology is used as an example for description. It may be understood that a capacitive sensor or an ultrasonic sensor may alternatively be used for fingerprint identification. This is not limited in this embodiment of the present disclosure.

Figure 3:
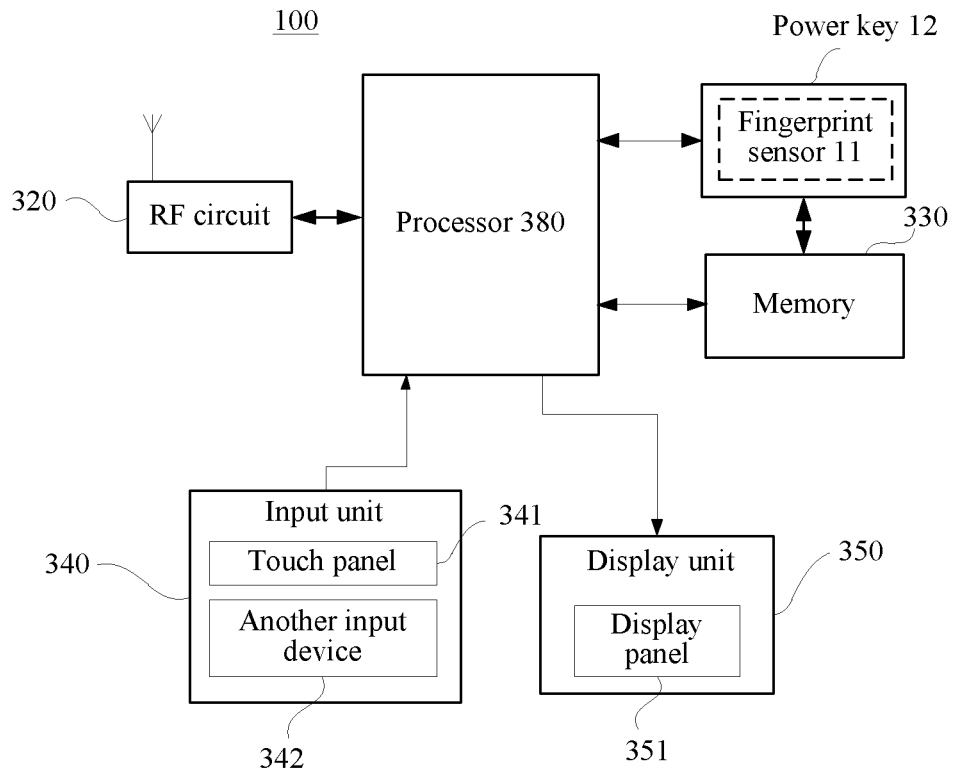
FIG. 3 is a schematic structural diagram of a mobile phone according to an embodiment of the present disclosure.

Further, with reference to FIG. 2, as shown in FIG. 3, the mobile phone 100 further includes components such as a processor 380, a memory 330, an RF (radio frequency, radio frequency) circuit 320, an input unit 340, and a display unit 350. A person skilled in the art may understand that the structure of the mobile phone shown in FIG. 3 does not constitute a limitation to the mobile phone, and the mobile phone may include more components or fewer components than those shown in the figure, or some components may be combined, or a different component deployment may be used.

An application having a fingerprint application function, such as an application store (in which application software can be downloaded or purchased) client, Alipay, WeiPay, or a bank client, may be installed on the mobile phone 100. In this way, when the user performs a corresponding operation on an operation interface of the application by using the input unit 340, a corresponding operation instruction is generated, for example, an unlock instruction or a payment instruction. After obtaining the operation instruction, the processor 380 may invoke a related software program or module from the memory 330 to execute the operation instruction.

It can be learned that the processor 380 is a control center of the mobile phone 100, and is connected to various parts of the entire mobile phone by using various interfaces and lines. By running or executing the software program and/or module stored in the memory 330, and invoking data stored in the memory 330, the processor 380 performs various functions of the mobile phone 100 and data processing, thereby performing overall monitoring on the mobile phone. Optionally, the processor 380 may integrate an application processor and a modem processor. The application processor mainly processes an operating system, a user interface, an application program, and the like. The modem processor mainly processes wireless communication. Certainly, the foregoing modem processor may alternatively not be integrated into the processor 380.

The memory 330 may be configured to store a software program and module. The processor 380 runs the software program and module stored in the memory 330, to implement various functional applications and data processing of the mobile phone 100. The memory 330 may mainly include a program storage area and a data storage area. The program storage area may store an operating system (for example, system firmware), an application program required by at least one function (for example, a fingerprint payment function and an image display function), a driver (for example, a fingerprint drive module), and the like.

The input unit 340 may be configured to: receive input digit or character information, and generate a key signal input related to a user setting and function control of the mobile phone 100. Specifically, the input unit 340 may include a touch panel 341 and another input device 342. The touch panel 341, also referred to as a touch panel, may collect a touch operation of the user on or near the touch panel (such as an operation of the user on or near the touch panel 341 by using any proper object or accessory such as a finger or a stylus), and drive a corresponding connection apparatus based on a preset program. In addition to the touch panel 341, the input unit 340 may further include the another input device 342. Specifically, the another input device 342 may include, but is not limited to, one or more of a physical keyboard, a functional key (such as a volume control key or a switch key), a trackball, a mouse, and a joystick.

The display unit 350 may be configured to display information entered by the user or information provided for the user, and various menus of the mobile phone 100. The display unit 350 may include a display panel 351. The touch panel 341 may cover the display panel 351. When the touch panel 341 detects a touch operation on or near the touch panel 341, the touch panel 341 transmits the touch operation to the processor 380 to determine a type of a touch event. Then, the processor 380 provides a corresponding visual output on the display panel 351 based on the type of the touch event. Although in FIG. 3, the touch panel 341 and the display panel 351 are used as two separate components to implement input and output functions of the mobile phone 100, in some embodiments, the touch panel 341 and the display panel 351 may be integrated to implement the input and output functions of the mobile phone 100.

The RF circuit 320 may be configured to receive and send signals during information transmission and receiving or a conversation. Generally, the RF circuit includes, but is not limited to, an antenna, at least one amplifier, a transceiver, a coupler, an LNA (low noise amplifier, low noise amplifier), a duplexer, and the like. In addition, the RF circuit 320 may also communicate with a network and another device by means of wireless communication. Any communication standard or protocol may be used for the wireless communication. This is not limited in this embodiment of the present disclosure.

In addition, the mobile phone 100 may further include sensors such as a gravity sensor, a light sensor, a gyroscope, a barometer, a hygrometer, a thermometer, and an infrared sensor, a power source supplying power to various components, a WiFi (wireless fidelity, wireless fidelity) module, a Bluetooth module, and the like. Details are not described herein.

Figure 4:
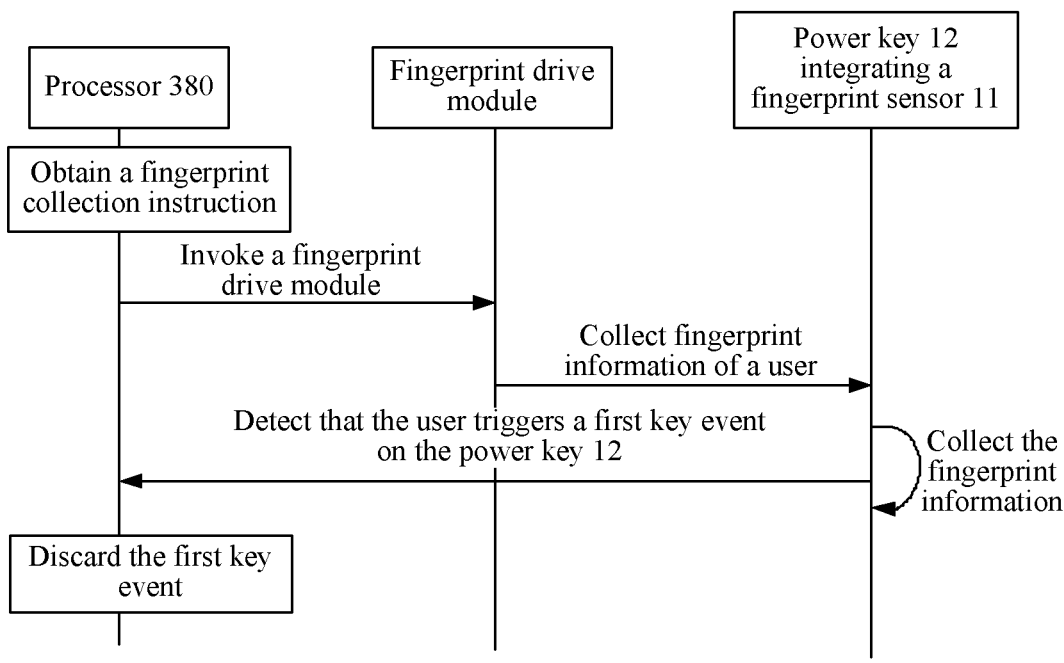
FIG. 4 is a schematic cooperation diagram of performing a fingerprint collection method by a terminal according to an embodiment of the present disclosure.

Specifically, based on a schematic structural diagram of the mobile phone 100, as shown in FIG. 4, in the fingerprint collection method provided in this embodiment of the present disclosure, when the user triggers a fingerprint application function of an application, for example, when the user clicks a fingerprint payment option in a shopping application, the application generates a fingerprint collection instruction and sends the fingerprint collection instruction to the processor 380. The fingerprint collection instruction is used to instruct to collect a fingerprint by using the fingerprint sensor 11 integrated on the power key 12. In this case, the processor 380 invokes the fingerprint drive module to drive the fingerprint sensor 11 to collect the fingerprint information recorded by the user on the power key 12. When a finger of the user touches the power key 12, sensing units (for example, the photosensitive diode or the phototransistor mentioned above) at different locations in the fingerprint sensor 11 each convert a received optical signal into a corresponding electrical signal and store the electrical signal in the memory 330. In this way, the fingerprint drive module can determine the fingerprint information of the user based on the electrical signals output by the sensing units at the different locations in the fingerprint sensor 11.

Figure 5:
FIG. 5 is a second schematic diagram of an application scenario of a terminal according to an embodiment of the present disclosure.

However, as shown in FIG. 5, at any moment of collecting the fingerprint information, if the processor 380 detects that the user triggers a first key event on the power key 12, for example, when the user performs a short press or a long press on the power key 12 by using a finger, because the first key event may cause an operation such as lock screen, shutdown, or restart, the processor 380 may discard the first key event, until the fingerprint information of the user is successfully collected. That is, in a process of collecting the fingerprint information of the user, a related function of the power key 12 may be temporarily disabled or locked. In this way, when the fingerprint sensor 11 is integrated on the power key 12, the related function of the power key 12 does not interfere in the process of collecting the fingerprint information, thereby avoiding a problem that a fingerprint application function related to a fingerprint collection process cannot be performed any longer.

Similarly, when the fingerprint sensor 11 is integrated on another function key (for example, a home key), to prevent, when the fingerprint sensor 11 collects the fingerprint information, the user from triggering a corresponding function of the function key to interrupt or interfere with the fingerprint collection process, the foregoing solution may be used. The processor 380 discards the first key event after detecting the first key event triggered by the user on the function key.

In addition, a sensor having another function may further be integrated on the function key. The home key is used as an example. A pressure sensor may further be disposed on the home key to sense a pressing force of the finger of the user. In this case, at any moment of collecting the fingerprint information, if it is detected that the user needs to invoke the pressure sensor to trigger a first key event on the home key, the first key event may be discarded, or a working status of the pressure sensor may be set to a disabled state or a locked state, thereby preventing, when the fingerprint sensor 11 collects the fingerprint information, the user from triggering the corresponding function of the function key to interrupt or interfere with the fingerprint collection process.

Figure 6:
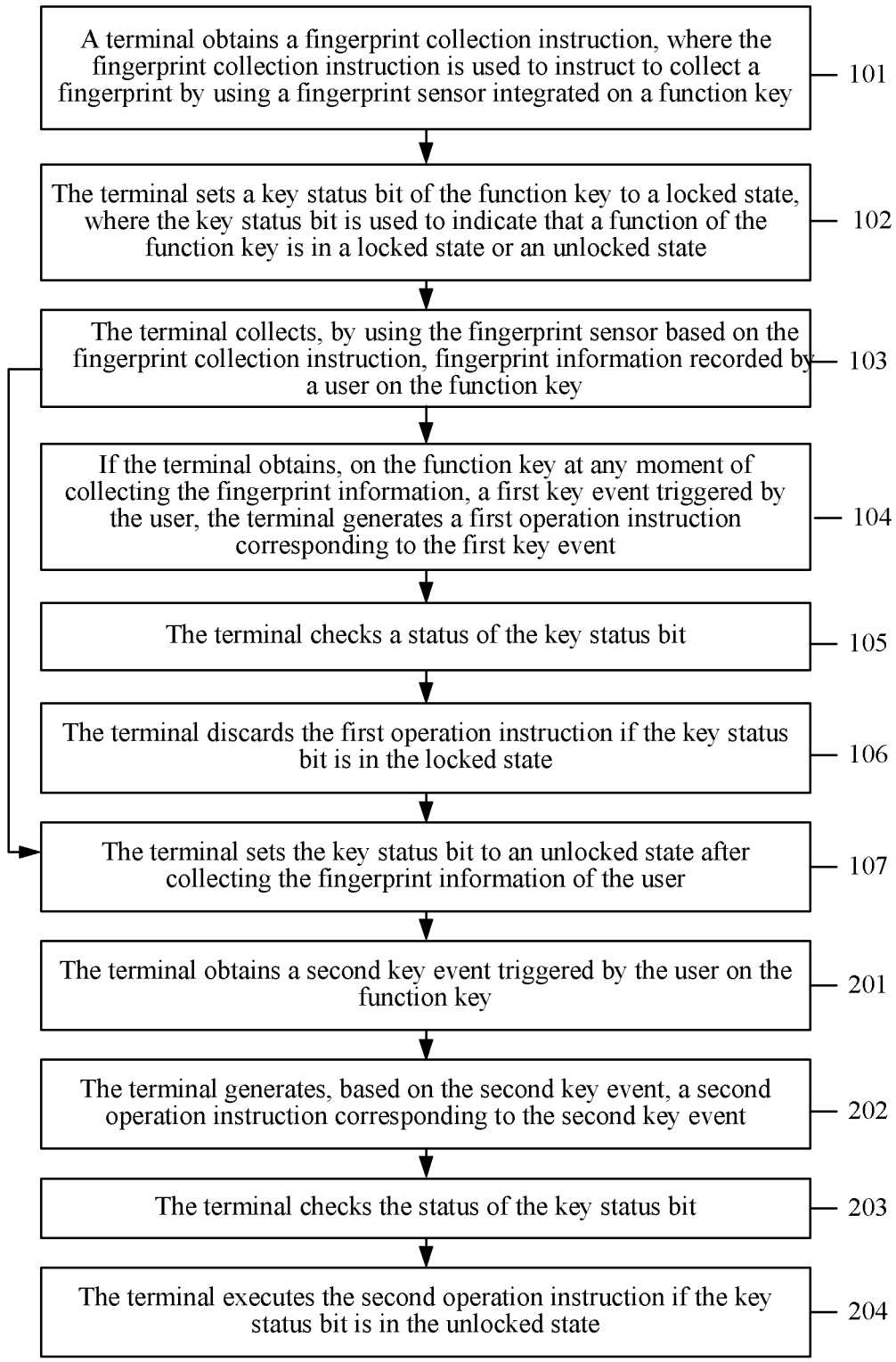
FIG. 6 is a first schematic flowchart of a fingerprint collection method according to an embodiment of the present disclosure.

The fingerprint collection method provided in this embodiment of the present disclosure is described in detail below with reference to the terminal provided in FIG. 1 to FIG. 3 and in which the fingerprint sensor 11 is integrated on any function key. As shown in FIG. 6, the method includes the following steps.

101: The terminal obtains a fingerprint collection instruction, where the fingerprint collection instruction is used to instruct to collect a fingerprint by using a fingerprint sensor integrated on a function key.

Specifically, when a user opens a target application having a fingerprint application function, if the user triggers the corresponding fingerprint application function, for example, fingerprint payment, fingerprint unlock, or a fingerprint gesture, a processor of the terminal may generate a fingerprint collection instruction based on a trigger operation of the user, and send the fingerprint collection instruction to a fingerprint drive module of the terminal. The fingerprint collection instruction is used to instruct the fingerprint drive module to collect the fingerprint of the user by using the fingerprint sensor integrated on the function key.

Certainly, for some fingerprint application functions in a system of the terminal, for example, fingerprint unlock or opening different applications by using different fingerprints, after detecting that the user triggers the fingerprint application function, the terminal may generate the foregoing fingerprint collection instruction.

Alternatively, the fingerprint collection instruction may also be sent by another terminal or an external device. This is not limited in this embodiment of the present disclosure. For example, when a wearable device used by the user needs to collect a fingerprint by using the terminal, the wearable device may send the fingerprint collection instruction to the terminal.

102: The terminal sets a key status bit of the function key to a locked state, where the key status bit is used to indicate that a function of the function key is in a locked state or an unlocked state.

In a memory of the terminal, the key status bit may be set for the function key. The key status bit is used to indicate that the function of the function key is in the locked state or the unlocked state. That the function key is a power key is used as an example. One bit may be used as a key status bit of the power key. When the bit is 0, it indicates that a function of the power key is in an unlocked state. That is, each related function (for example, a lock screen or wakeup function triggered by a short press on the power key, or a screenshot function triggered by a long press on the power key) of the power key is in a normal running state. When the bit is 1, it indicates that a function of the power key is in a locked state. That is, each related function of the power key is disabled or the power key temporarily stops working.

In step 102, after the fingerprint drive module of the terminal obtains the fingerprint collection instruction, the key status bit of the function key may be set to the locked state, so as to ensure that each related function of the function key is disabled in a subsequent fingerprint collection process.

103: The terminal collects, by using the fingerprint sensor based on the fingerprint collection instruction, fingerprint information recorded by a user on the function key.

In step 103, the fingerprint drive module may invoke the fingerprint sensor to collect the fingerprint information recorded by the user on the function key. For example, the fingerprint drive module sets the fingerprint sensor to a ready (Ready) state, so that the fingerprint sensor is powered on, to wait for the user to record a fingerprint on the function key.

104: If the terminal obtains, on the function key at any moment of collecting the fingerprint information, a first key event triggered by the user, the terminal generates a first operation instruction corresponding to the first key event.

The first key event may be any operation other than a fingerprint recording event, for example, a press operation on the function key. This is not limited in this embodiment of the present disclosure.

Specifically, when step 103 is being performed, that is, when the fingerprint information is being collected, if the first key event triggered by the user is obtained on the function key, the processor of the terminal invokes system firmware in the memory to generate the first operation instruction corresponding to the first key event.

For example, that the function key is a power key is still used as an example. When a finger of the user touches the power key to input the fingerprint information, once the first key event triggered by the user on the power key is detected, for example, a long press on the power key or a short press on the power key, the processor is triggered to invoke the system firmware to generate the first operation instruction corresponding to the first key event. For example, in a screen wakeup state, a first operation instruction corresponding to a long press on the power key is a screenshot instruction, and a first operation instruction corresponding to a short press on the power key is a lock screen instruction.

105: The terminal checks a status of the key status bit.

106: The terminal discards the first operation instruction if the key status bit is in the locked state.

Different from the prior art, after generating the first operation instruction corresponding to the first key event, the terminal determines, by querying the status of the key status bit, whether to execute the first operation instruction.

Specifically, if the key status bit is in the locked state, it indicates that the current terminal is collecting the fingerprint information of the user by using the fingerprint sensor. Each related function of the function key is disabled or the function key temporarily stops working. In this case, the terminal may directly discard the first operation instruction, that is, discard the first key event.

In this way, a function of temporarily disabling the related function of the function key in a process of collecting the fingerprint information of the user may be implemented based on an existing procedure of generating a corresponding operation instruction by invoking the system firmware, thereby reducing modifications of a related program such as the system firmware in the terminal, and reducing implementation costs of the terminal provided in this embodiment of the present disclosure.

Optionally, in step 106, if the key status bit is in the locked state, the terminal displays a prompt dialog box, to prompt the user whether to perform an operation (for example, lock screen, shutdown, restart, or standby) corresponding to the first key event. If the user chooses to perform the operation corresponding to the first key event, the terminal performs the operation corresponding to first key event. If the user chooses not to perform the operation corresponding to the first key event, the terminal discards the first operation instruction.

For example, in a fingerprint payment authentication process, the user presses the power key (a fingerprint sensor is integrated on the power key). In this case, the user may want to give up fingerprint payment (for example, the user gives up payment because the user abandons purchasing of a product), and the terminal prompts the user whether to continue the fingerprint payment or perform a lock screen operation. If the user chooses to perform the lock screen operation, the terminal terminates a payment operation and locks a screen. If the user chooses to perform a fingerprint payment operation, the terminal continues to perform the fingerprint payment operation and discards a power key event.

Alternatively, if the key status bit is in the locked state, the terminal may not immediately discard the first operation instruction, but temporarily store the first operation instruction. For example, when the key status bit is in the locked state, the terminal may set a timer for timing. In a preset time period, the generated first operation instruction is stored in a buffer, and the first operation instruction is discarded at the end of the preset time period.

In this way, if collection of the fingerprint information of the user is completed in the preset time period, the terminal may still perform the first operation instruction based on the first operation instruction, thereby restoring the first key event triggered by the user.

Further, after obtaining the first key event, the terminal may further determine a priority of the first key event and a priority of collecting the fingerprint information. Optionally, the first key event and a fingerprint collection event have different priority values (that is, priority value). A larger priority value indicates a lower priority level.

For example, the terminal may determine, based on a system message running in the terminal, that the current terminal is in a screen-on state, screen-off state, or a lock screen state.

In this case, when the terminal is in the screen-on state, the user may directly record the fingerprint information on the power key. In this case, the first key event triggered by the user on the power key interferes with a fingerprint recording process. Therefore, it may be determined that a priority value of collecting the fingerprint information is 1, and a priority value of the first key event is 2 (a priority level indicated by the priority value 1 is higher than a priority level indicated by the priority value 2).

When the terminal is in the screen-off state or the lock screen state, the terminal first needs to wake up a screen by performing the first key event, and then can record the fingerprint information on the power key. Therefore, it may be determined that a priority value of collecting the fingerprint information is 2, and a priority value of the first key event is 1.

In this case, in step 106, the terminal may further determine whether the first operation instruction needs to be discarded based on the priority of the first key event and the priority of collecting the fingerprint information.

For example, after receiving the fingerprint collection instruction, the terminal automatically switches to the screen-off state if the user performs no operation for a long time. In this case, if the first key event, for example, a short press on the power key, triggered by the user on the power key is obtained, where the short press operation on the power key can wake up the screen of the terminal, and if the first operation instruction corresponding to the first key event is directly discarded, the terminal switches to the lock screen state after being in the screen-off state for a time period. In this case, the user cannot record the fingerprint information. Therefore, the terminal may first determine that the priority value of collecting the fingerprint information is 2, and that the priority value of the first key event is 1; and further, compare the priority of the first key event and the priority of collecting the fingerprint information, and perform the first key event having a higher priority.

107: The terminal sets the key status bit to an unlocked state after collecting the fingerprint information of the user.

When collecting the fingerprint information of the user, the fingerprint sensor stores a generated electrical signal into the memory. The fingerprint drive module matches the stored electrical signal with fingerprint information pre-stored by the user. If the matching succeeds, it indicates that authentication of an identity of the user succeeds. If the matching fails, it indicates that authentication of an identity of the user fails. No matter whether the authentication of the identity succeeds or fails, an authentication result needs to be sent to the target application that triggers the fingerprint collection process. In this case, it may be considered that the fingerprint information of the user has been successfully collected. Further, the terminal can change the key status bit from the locked state to the unlocked state, so that the related function of the function key returns to normal.

Figure 7:
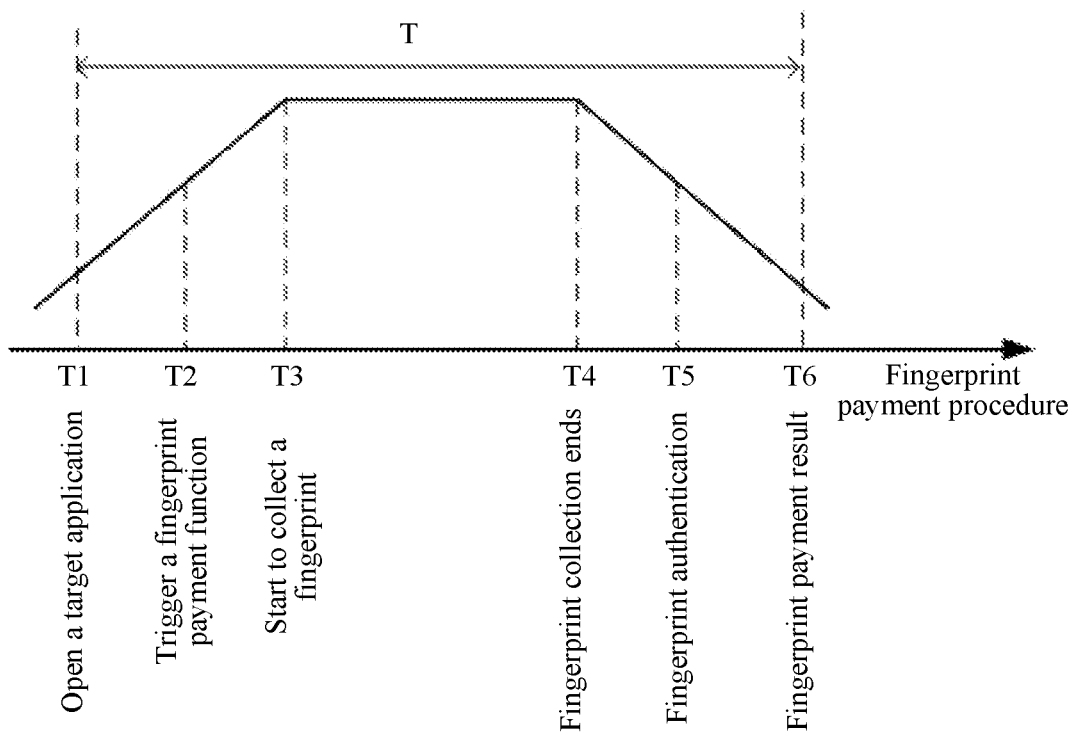
FIG. 7 is a schematic diagram of a fingerprint payment procedure according to an embodiment of the present disclosure.

It should be noted that as shown in FIG. 7, that a fingerprint payment function is the foregoing fingerprint application function is used as an example. Based on a chronological order in the fingerprint payment procedure performed by the user, the fingerprint payment procedure may be divided into: opening a target application (the target application includes the fingerprint payment function)—triggering the fingerprint payment function (as shown in FIG. 1, the user clicks a fingerprint payment option)—collecting a fingerprint—fingerprint authentication—a fingerprint payment result.

In this case, as shown in FIG. 7, the terminal may set the key status bit of the function key to the locked state at a moment T1 at which the user opens the target application, may set the key status bit of the function key to the locked state at a moment T2 at which the user triggers the fingerprint payment function, or may set the key status bit of the function key to the locked state at a moment T3 at which a fingerprint touch is detected and a fingerprint starts to be collected. That is, the terminal may set the key status bit of the function key to the locked state at any moment from a time point at which the user opens the target application to a time point at which the fingerprint starts to be collected (that is, a time period of T1 to T3 in FIG. 7), so as to ensure that each related function of the function key is disabled in the subsequent fingerprint collection process.

Correspondingly, the terminal may set the key status bit to the unlocked state at a moment T4 at which fingerprint collection ends, may set the key status bit to the unlocked state at a moment T5 at which fingerprint authentication is performed, or may set the key status bit to the unlocked state when a fingerprint payment result is obtained, that is, at a moment T6 at which the fingerprint payment is completed. That is, the terminal may set the key status bit to the unlocked state at any moment from a time point at which the fingerprint collection ends to a time point at which the fingerprint payment is completed (that is, a time period of T4 to T6 in FIG. 7), thereby restoring an original function of the function key.

If the terminal sets the key status bit to the unlocked state when the fingerprint collection ends, the related function of the function key can be restored for the user as soon as possible. If the terminal sets the key status bit to the unlocked state after the fingerprint authentication, it can be ensured that there is no interference from the original function of the function key in the fingerprint collection process and the fingerprint authentication process. If the terminal sets the key status bit to the unlocked state when the fingerprint payment is completed, it can be ensured that there is no interference from the original function of the function key before the fingerprint payment is completed, thereby improving payment reliability. Certainly, the user may set, based on an actual requirement, a time for changing the key status bit. This is not limited in this embodiment of the present disclosure.

Further, if the terminal already stores the first operation instruction in step 106, after step 107 is performed, that is, after the terminal sets the key status bit to the unlocked state, the terminal may further execute the first operation instruction. In this way, the terminal not only can be prevented from being interfered by the original function of the function key in the fingerprint collection process but also can complete the first key event triggered by the user.

Optionally, as shown in FIG. 5, in the fingerprint payment process, the terminal usually displays a current payment status to the user in real time. In this case, if the terminal immediately executes the first operation instruction, for example, an instruction of returning to a terminal desktop, after the terminal completes the fingerprint collection, learning of a payment result of the fingerprint payment by the user is affected. Therefore, as shown in FIG. 7, the terminal may execute the first operation instruction at or after the moment T6 at which the fingerprint payment is completed. In this way, it can be ensured that the terminal executes the first operation instruction after completing the fingerprint payment and displaying the payment result to the user, improving user experience. The terminal displays the fingerprint payment result at the moment T6 by using the display unit 350 (FIG. 3), for example, displaying a user interface including text content of "payment succeeds".

Certainly, for other fingerprint application functions, for example, an application function such as fingerprint unlock or a fingerprint gesture for which the fingerprint of the user needs to be collected, interference from the original function of the function key in the fingerprint collection process can be avoided by setting the key status bit based on the foregoing method.

Subsequently, still as shown in FIG. 6, the terminal may further perform the following step 201 to step 204, that is, trigger the related function of the function key.

201: The terminal obtains a second key event triggered by the user on the function key.

The second key event is the same as or different from the first key event. For example, the second key event may be a short press or a long press on the function key.

202: The terminal generates, based on the second key event, a second operation instruction corresponding to the second key event.

Similar to step 104, once the second key event, for example, a long press on the power key, triggered by the user on the function key is detected, the processor is triggered to invoke the system firmware in the memory to generate the second operation instruction corresponding to the second key event. For example, a second operation instruction corresponding to the long press on the power key is a screenshot instruction.

203: The terminal checks the status of the key status bit.

204: The terminal executes the second operation instruction if the key status bit is in the unlocked state.

Similar to step 105 and step 106, after generating the second operation instruction corresponding to the second key event, the terminal can determine, still by querying the status of the key status bit, whether to execute the second operation instruction.

Different from step 106, because the key status bit has been set to the unlocked state in step 107, that is, each related function of the function key is in a normal running state. That is, executing the second operation instruction and collecting the fingerprint information do not conflict with each other in this case. Therefore, the terminal can directly execute the second operation instruction.

In this way, this embodiment of the present disclosure provides the fingerprint collection method, so that in the process of collecting the fingerprint information of the user, the related function of the function key integrating the fingerprint sensor can be temporarily disabled. In this way, the related function of the function key does not interfere in the process of collecting the fingerprint information by using the fingerprint sensor, thereby avoiding a problem that the fingerprint application function related to the fingerprint collection process cannot be performed any longer.

Figure 8:
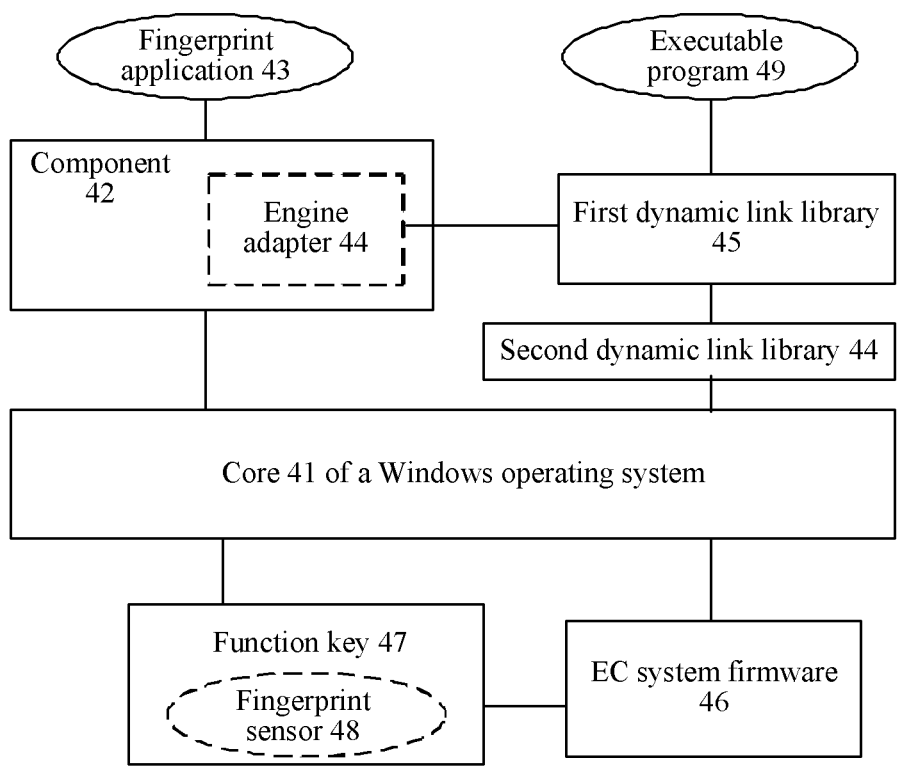
FIG. 8 is a schematic architectural diagram of a tablet computer according to an embodiment of the present disclosure.

For example, FIG. 8 is a schematic architectural diagram of a tablet computer 200. The fingerprint collection method is described below by using the tablet computer 200 as an example.

The tablet computer 200 may have a Windows operating system. A component 42 used for a Windows biometric service (Windows biometric service) and a fingerprint application (Application, APP) 43 having a fingerprint application function are run on a core 41 of the Windows operating system. The component 42 includes a fingerprint drive module provided by a fingerprint provider, for example, an engine adapter (Engine Adapter) 44. The engine adapter 44 may be configured to detect status information of a fingerprint sensor 48. For example, the engine adapter 44 may set a status of the fingerprint sensor 48 to a ready (Ready) state, so that the fingerprint sensor 48 is powered on, to wait for the user to record a fingerprint on a function key 47.

In this embodiment of the present disclosure, a first dynamic link library (Dynamic Link Library, DLL) 45 and an EC (Embedded Control, embedded control) system firmware 46 may be additionally introduced in the tablet computer 200.

The first dynamic link library 45 can obtain the status information of the fingerprint sensor that is sent by the engine adapter 44, and can detect a lock screen, hibernation, standby, or restart message or the like generated by the Windows system, that is, obtain application scenario information of the tablet computer 200.

In this case, the first dynamic link library 45 can invoke the EC system firmware 46 to lock or unlock a related function of the function key 47 based on the status information of the fingerprint sensor 48 and the application scenario information.

For example, when the user triggers a fingerprint payment function of the fingerprint application 43, the fingerprint application 43 generates a fingerprint collection instruction, triggering the component 42 to wait for, by using the fingerprint sensor 48, the user to record a fingerprint on the function key 47. In this case, the engine adapter 44 may set the fingerprint sensor 48 to a ready state, and send the ready state of the fingerprint sensor 48 to the first dynamic link library 45. In this case, if the first dynamic link library 45 detects that the current tablet computer 200 is in a screen-on state, that is, a priority of collecting the fingerprint information is higher than a priority of a first key event, the first dynamic link library 45 invokes the EC system firmware 46 to lock the related function of the function key 47.

In this way, in a process of collecting the fingerprint information, if the first key event triggered by the user is obtained on the function key 47, the first dynamic link library 45 may directly discard the first key event, or temporarily store the first key event, and executes a first operation instruction corresponding to the first key event after the fingerprint information of the user is collected, thereby avoiding interference from the related function of the function key 47 in the process of collecting the fingerprint information.

Further, when the first dynamic link library 45 detects a lock screen message generated by the Windows system, that is, the tablet computer 200 is in a locked state, the user needs to unlock the tablet computer 200 and then can normally use a function such as the fingerprint application 43. In this case, the first dynamic link library 45 invokes the EC system firmware 46 to unlock the related function of the function key 47.

Similarly, when detecting a hibernation, standby, or restart message generated by the Windows system, the first dynamic link library 45 may also invoke the EC system firmware 46 to unlock the related function of the function key 47.

In addition, as shown in FIG. 8, a second dynamic link library 44 may further be provided in the tablet computer 200. Cooperating with the Windows operating system, the second dynamic link library 44 may provide a read/write (Read/Write) interface between the first dynamic link library 45 and the EC system firmware 46, thereby establishing a communications channel between the first dynamic link library 45 and the EC system firmware 46.

Further, as shown in FIG. 8, a fingerprint-information executable program 49 may further be provided in the tablet computer 200. The executable program 49 may display, by using an animation based on the status information of the fingerprint sensor 48 and the application scenario information that are obtained by the first dynamic link library 45, each status of recording the fingerprint by the user and a fingerprint authentication or payment result, for example, information such as a payment success/failure, so as to inform the user of a current fingerprint status, and establish a friendly man-machine interface for the user.

Figure 9:
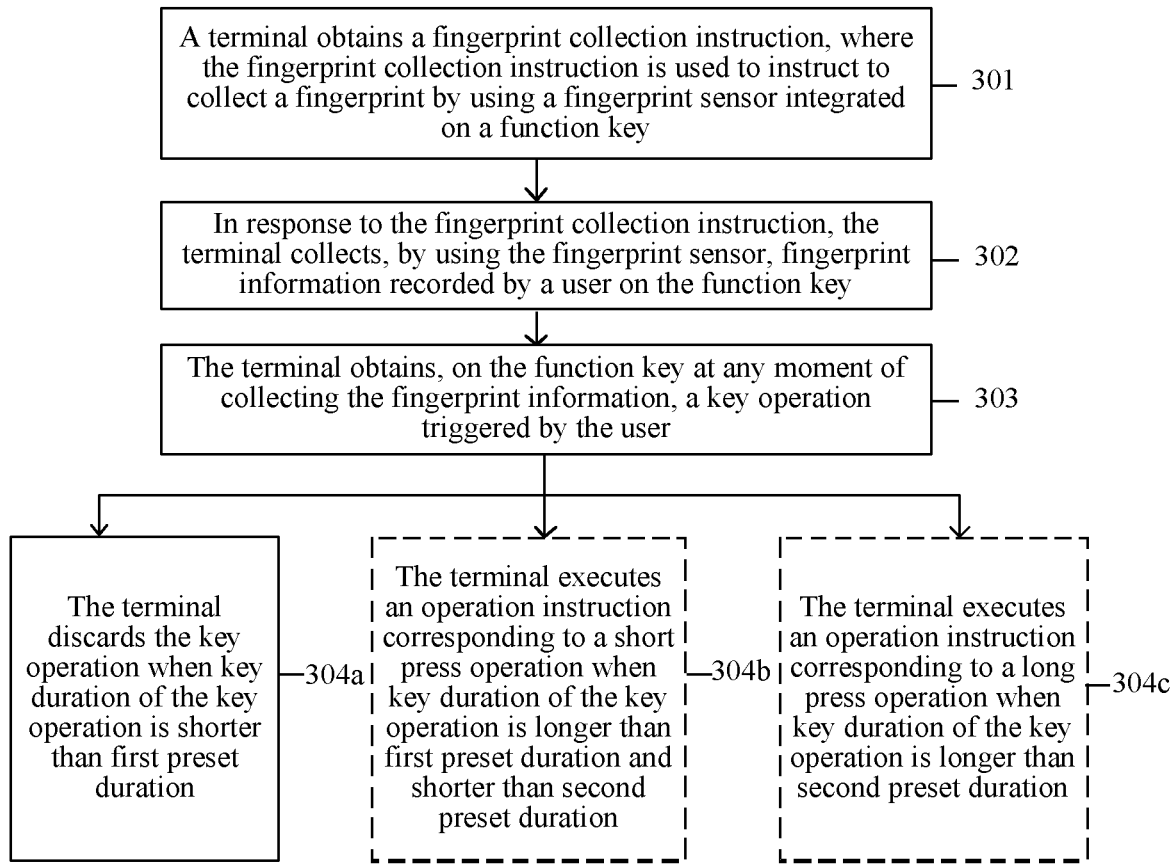
FIG. 9 is a second schematic flowchart of a fingerprint collection method according to an embodiment of the present disclosure.

An embodiment of the present disclosure provides a fingerprint collection method. As shown in FIG. 9, the method includes the following steps.

301: A terminal obtains a fingerprint collection instruction, where the fingerprint collection instruction is used to instruct to collect a fingerprint by using a fingerprint sensor integrated on a function key.

302: In response to the fingerprint collection instruction, the terminal collects, by using the fingerprint sensor, fingerprint information recorded by a user on the function key.

Specifically, in step 301, when the user triggers a corresponding fingerprint application function, for example, fingerprint payment, fingerprint unlock, or a fingerprint gesture, a processor of the terminal may generate a fingerprint collection instruction based on a trigger operation of the user, and send the fingerprint collection instruction to a fingerprint drive module of the terminal. The fingerprint collection instruction is used to instruct the fingerprint drive module to collect the fingerprint of the user by using the fingerprint sensor integrated on the function key.

For example, in the following embodiments, descriptions are provided by using an example in which a power key is used as the foregoing function key. It may be understood that the function key may alternatively be a home key, a volume adjustment key, or the like. This is not limited in this embodiment of the present disclosure.

In step 302, the terminal may invoke, by using the fingerprint drive module, the fingerprint sensor to collect the fingerprint information recorded by the user on the power key. For example, the fingerprint drive module sets the fingerprint sensor on the power key to a ready (Ready) state, so that the fingerprint sensor is powered on, to wait for the user to record a fingerprint on the power key.

303: The terminal obtains, on the function key at any moment of collecting the fingerprint information, a key operation triggered by the user.

304a: The terminal discards the key operation when key duration of the key operation is shorter than first preset duration.

304b: The terminal executes an operation instruction corresponding to a short press operation when key duration of the key operation is longer than first preset duration and shorter than second preset duration.

304c: The terminal executes an operation instruction corresponding to a long press operation when key duration of the key operation is longer than second preset duration.

Because the fingerprint sensor is integrated on the power key, the power key has both a fingerprint collection function and an original key function of the power key (for example, a lock screen function or a shutdown function). In this case, to avoid a conflict with the original key function in a fingerprint collection process, when the fingerprint information of the user is collected, if a key operation triggered by the user is obtained on the power key, the terminal may determine, based on key duration of the key operation on the power key, whether the key operation is an accidental touch operation.

Figure 10:
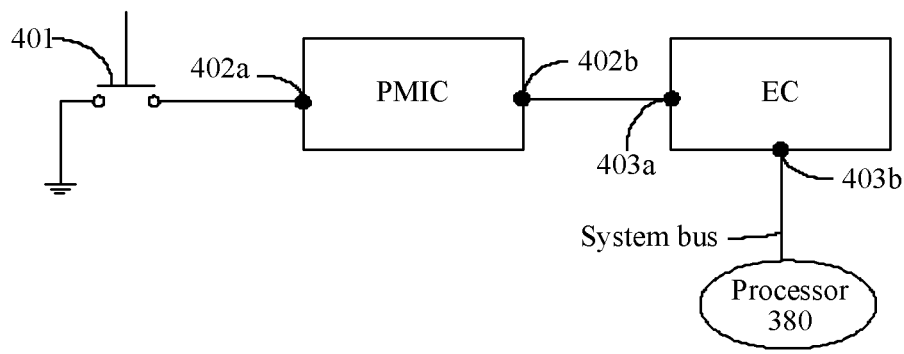
FIG. 10 is a first schematic diagram of an application scenario of a fingerprint collection method according to an embodiment of the present disclosure.

Specifically, as shown in FIG. 10, a power key 401 of the terminal is connected to an input end 402a of a PMIC (power management integrated circuit, power management integrated circuit), an output end 402b of the PMIC is connected to an input end 403a of an EC (Embedded Control, embedded control) system firmware, and an output end 403b of the EC system firmware is connected to a processor 380 of the terminal by using a system bus.

In this case, at any moment of collecting the fingerprint information, the user usually touches, by using a finger, a fingerprint sensor disposed on a surface of the power key 401, so that the fingerprint sensor collects the fingerprint information. Once the user triggers a key operation on the power key 401, the power key 401 is closed, a circuit shown in FIG. 10 is conducted after the power key 401 is closed. In this case, the power key 401 generates a power key signal (for example, the power key signal is a low-level signal), and sends the power key signal to the input end 402a of the PMIC. The PMIC sends the power key signal to the input end 403a of the EC by using the output end 402b of the PMIC. The EC starts timing after obtaining the power key signal, so as to obtain key duration of the key operation performed by the user on the power key 401.

Figure 11:
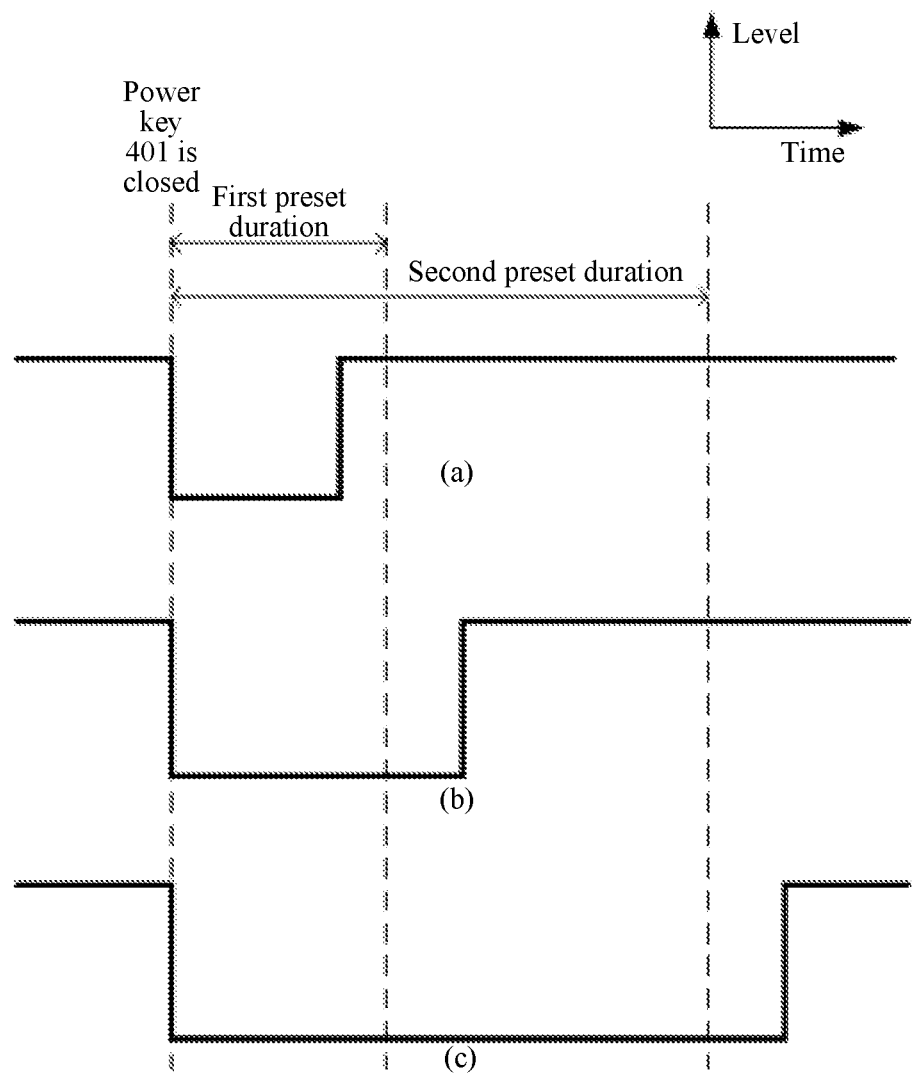
FIG. 11 is a second schematic diagram of an application scenario of a fingerprint collection method according to an embodiment of the present disclosure.

In this case, as shown by (a) in FIG. 11, when key duration for the power key signal (that is, a low-level signal in (a) in FIG. 11) is shorter than the first preset duration, because the key duration is relatively short, it may be considered that the key operation is accidentally performed by the user. That is, the intention of the user in this case still is performing the fingerprint collection function on the power key instead of performing the original key function of the power key. Therefore, the terminal may discard the key operation, thereby implementing a foolproof touch function.

Correspondingly, as shown by (b) in FIG. 11, when key duration for the power key signal (that is, a low-level signal in (b) in FIG. 11) is longer than the first preset duration and shorter than the second preset duration, it may be considered that the key operation is an effective short press operation. In this case, the terminal may report the power key signal to the processor 380 by using the system bus. The processor 380 executes an operation instruction corresponding to the short press operation, for example, a hibernation instruction, a sleeping instruction, or a display off instruction. This is not limited in this embodiment of the present disclosure.

In addition, as shown by (c) in FIG. 11, when key duration for the power key signal (that is, a low-level signal in (c) in FIG. 11) is longer than the second preset duration, it may be considered that the key operation is an effective long press operation. In this case, the terminal may report the power key signal to the processor 380 by using the system bus. The processor 380 executes an operation instruction corresponding to the long press operation, for example, a forced shutdown instruction or a screenshot instruction. This is not limited in this embodiment of the present disclosure.

The second preset duration is longer than the first preset duration. For example, a time difference between the second preset duration and the first preset duration is four seconds. Certainly, a person skilled in the art may set the first preset duration and/or the second preset duration based on actual experience or an actual application scenario. In addition, a corresponding setting interface may further be provided in the terminal, so that the user may adjust a value of the first preset duration and/or the second preset duration by using the setting interface. This is not limited in this embodiment of the present disclosure.

In this way, based on the fingerprint collection method shown in step 301 to step 304 (step 304 includes 304a to 304c), the terminal may discard a key operation having relatively short key duration (which usually is an accidental touch operation) in the fingerprint collection process. In this way, key operations having relatively short key duration do not interfere with a normal fingerprint collection process. However, when key duration of a key operation is relatively long, the key operation is usually intentionally performed by the user. In this case, the terminal may trigger the original key function of the power key, thereby avoiding a conflict between a fingerprint collection function and the original key function of the power key when a fingerprint sensor is integrated on the power key.

Further, before determining whether a current key operation is an accidental touch operation, the terminal may first obtain a current screen status. When a screen is in a screen-on state (in this case, the screen may be in an unlocked state or a locked state, and this is not limited in this embodiment of the present disclosure), whether the current key operation is an accidental touch operation may further be determined based on the foregoing key duration. When the screen is not in the screen-on state (for example, a screen-off state), the terminal does not need to perform a foolproof touch operation, but directly reports the power key signal generated by the power key 401 to the processor 380 by using the system bus. The processor 380 executes an operation instruction corresponding to the power key signal, to reduce power consumption of the terminal.

Figure 12:
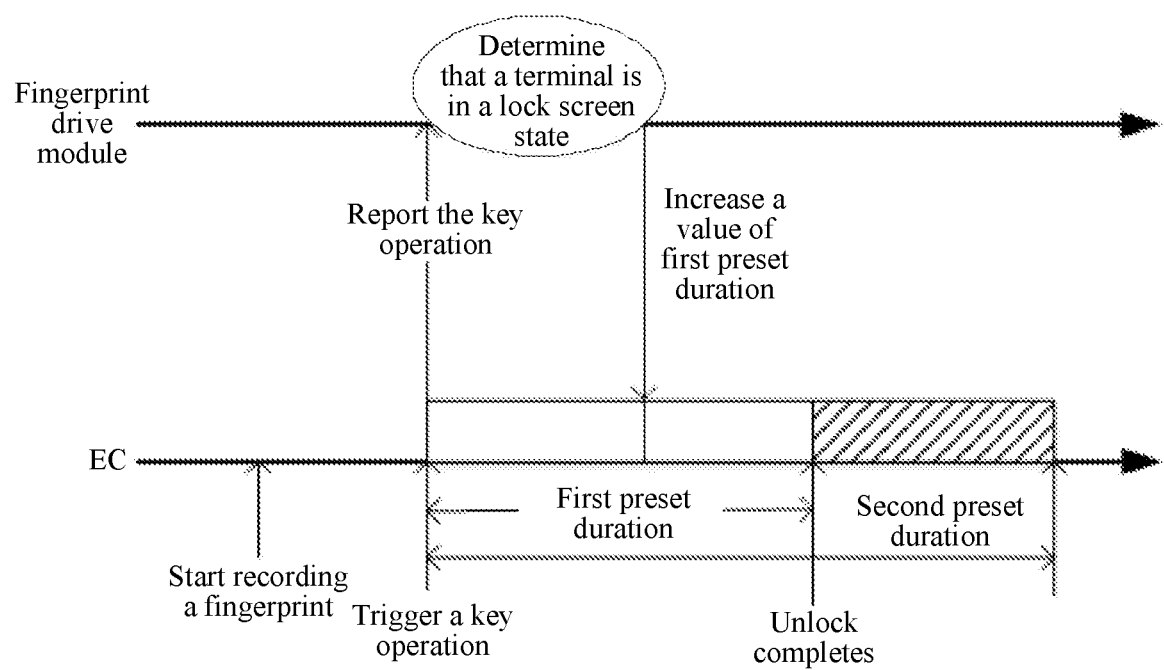
FIG. 12 is a third schematic diagram of an application scenario of a fingerprint collection method according to an embodiment of the present disclosure.

In addition, the EC may further interact with the fingerprint drive module. When the user triggers the key operation on the power key, the EC reports information about the key operation to the fingerprint drive module. The fingerprint drive module may determine an application scenario of a current terminal. For example, the current terminal is in a target application scenario such as a lock screen state, a fingerprint recording state, or a fingerprint identification state. In this case, as shown in FIG. 12, when the terminal is in the lock screen state, the fingerprint drive module may instruct the EC to adjust the value of the first preset duration, for example, increasing the value of the first preset duration, until a current fingerprint unlock operation is completed.

In this way, when the terminal performs a fingerprint-related function such as unlock, fingerprint recording, or fingerprint payment, a fingerprint collection (or fingerprint identification) process that is being performed is not interrupted or interfered with due to the key operation triggered by the user on the power key.

It may be understood that to implement the foregoing functions, the foregoing various network elements such as the terminal include hardware structures and/or software modules corresponding to the various functions. A person of ordinary skill in the art should be easily aware that in combination with units and algorithm steps in the examples described in the embodiments disclosed in this specification, the present disclosure can be implemented by hardware or a combination of hardware and computer software. Whether a function is performed by hardware or computer software driving hardware depends on particular applications and design constraint conditions of the technical solutions. A person skilled in the art may use different methods to implement the described functions for each particular application, but it should not be considered that the implementation goes beyond the scope of the present disclosure.

In the embodiments of the present disclosure, functional module division may be performed on the terminal based on the examples of the methods. For example, various functional modules may be divided based on the corresponding functions, or two or more functions may be integrated into one processing module. The integrated module may be implemented in a form of hardware, or may be implemented in a form of a software functional module. It should be noted that the module division in the embodiments of the present disclosure is an example, and is merely logical function division. There may be another division manner in an actual implementation.

Figure 13:
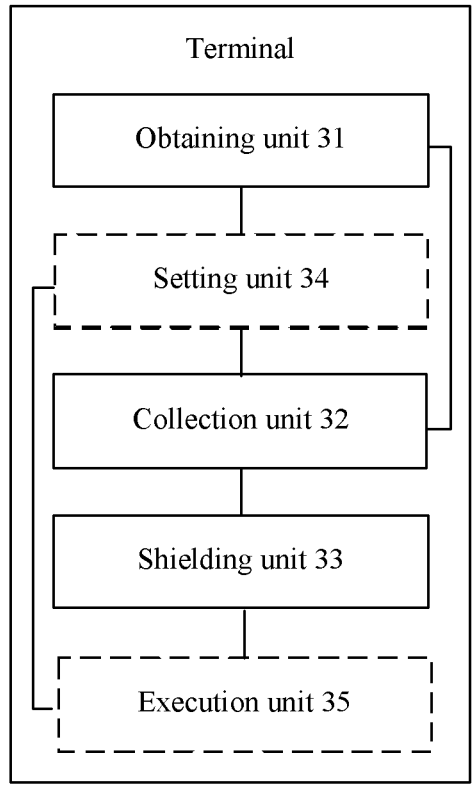
FIG. 13 is a first schematic structural diagram of a terminal according to an embodiment of the present disclosure.
Figure 14:
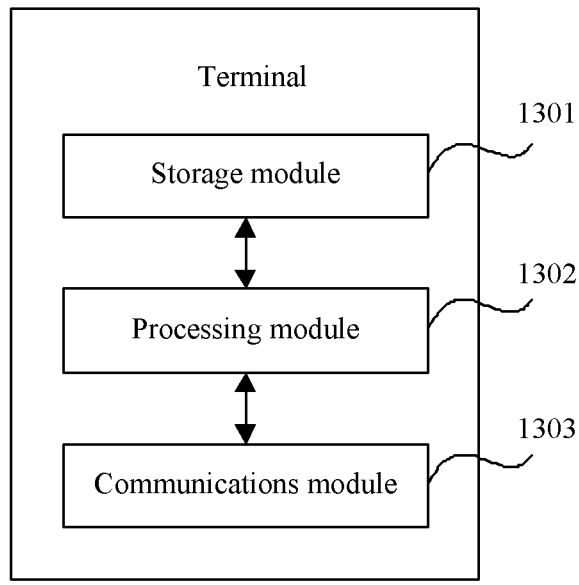
FIG. 14 is a second schematic structural diagram of a terminal according to an embodiment of the present disclosure.

When various functional modules are divided based on the corresponding functions, FIG. 13 is a possible schematic structural diagram of the terminal in the foregoing embodiments. The terminal includes an obtaining unit 31, a collection unit 32, a shielding unit 33, a setting unit 34, and an execution unit 35.

The obtaining unit 31 is configured to support the terminal in performing the processes 101 and 201 in FIG. 6 and the processes 301 and 303 in FIG. 9. The collection unit 32 is configured to support the terminal in performing the process 103 in FIG. 6 and the process 302 in FIG. 9. The shielding unit 33 is configured to support the terminal in performing the processes 104 to 106 in FIG. 6. The setting unit 34 is configured to support the terminal in performing the processes 102 and 106 in FIG. 6. The execution unit 35 is configured to support the terminal in performing the processes 202 to 204 in FIG. 6 and the processes 304a to 304c in FIG. 9. All related content of the steps in the foregoing method embodiments may be referred for the functional descriptions of the corresponding functional modules. Details are not described herein again.

When an integrated unit is used, FIG. 13 is a possible schematic structural diagram of the terminal in the foregoing embodiments. The terminal includes a processing module 1302 and a communications module 1303. The processing module 1302 is configured to control and manage an action of the terminal. For example, the processing module 1302 is configured to support the terminal in performing the processes 101 to 107 and 201 to 204 in FIG. 6, and/or configured to perform another process in a technology described in this specification. The communications module 1303 is configured to support the terminal in communicating with another network entity. The terminal may further include a storage module 1301, configured to store program code and data of the terminal.

The processing module 1302 may be a processor or a controller, and for example, may be a central processing unit (Central Processing Unit, CPU), a general purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logical device, a transistor logical device, a hardware component, or any combination thereof. The controller/processor can implement or perform various examples of logic blocks, modules, and circuits described with reference to content disclosed in the present disclosure. The processor may also be a combination that implements a calculation function, for example, including one microprocessor or a combination of multiple microprocessors, or a combination of a DSP and a microprocessor. The communications module 1303 may be a transceiver, a transmission/receiving circuit, a communications interface, or the like. The storage module 1301 may be a memory.

That the terminal is a mobile phone is used as an example. When the processing module 1302 is a processor, the communications module 1303 is a communications interface, and the storage module 1301 is a memory, the terminal in the embodiments of the present disclosure may be the mobile phone 100 shown in FIG. 3 or the tablet computer 200 shown in FIG. 8.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid state disk (SSD)), or the like.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. A fingerprint collection method, implemented by a terminal, the fingerprint collection method comprising:
   obtaining a fingerprint collection instruction, wherein the fingerprint collection instruction instructs the terminal to collect a fingerprint;
   setting, in response to the fingerprint collection instruction, a function key status of a function key to a locked state;
   displaying, in response to the fingerprint collection instruction, a fingerprint collecting indication on a screen of the terminal, wherein the fingerprint collecting indication corresponds to a fingerprint pattern;
   collecting, using a fingerprint sensor integrated with the function key of the terminal, fingerprint information of a user while the fingerprint collecting indication is displayed on the screen;
   obtaining a first function key event of the function key;
   performing a fingerprint recording process based on the fingerprint information;
   displaying an animation of each status of recording the fingerprint information by the user;
   refraining from executing the first function key event when the function key status is the locked state;

setting the function key status to an unlocked state after a fingerprint procedure is completed, wherein the fingerprint procedure comprises collecting the fingerprint information; and executing the first function key event after setting the function key status to the unlocked state.

2. The fingerprint collection method of claim 1, wherein obtaining the fingerprint collection instruction further comprises detecting that a fingerprint authentication function in a first application is triggered.

3. The fingerprint collection method of claim 1, wherein obtaining the fingerprint collection instruction comprises obtaining the fingerprint collection instruction from another terminal.

4. The fingerprint collection method of claim 1, wherein the method further comprises discarding a first operation instruction corresponding to the first function key event in response to setting the function key status to the locked state.

5. The fingerprint collection method of claim 1, wherein the method further comprises:
determining a priority of the first function key event and a priority of collecting the fingerprint information; and
discarding the first function key event when the priority of collecting the fingerprint information is higher than the priority of the first function key event.

6. The fingerprint collection method of claim 1, wherein the fingerprint procedure further comprises collecting the fingerprint information or performing fingerprint authentication.

7. The fingerprint collection method of claim 6, further comprising generating, in response to the first function key event, an operation instruction, wherein the operation instruction comprises an instruction to cause the terminal to execute a lock screen operation or a returning to a terminal desktop operation.

8. The fingerprint collection method of claim 1, wherein the fingerprint collection method further comprises storing the first function key event while the function key status is the locked state.

9. The fingerprint collection method of claim 1, wherein the fingerprint procedure is completed within a preset time period.

10. The fingerprint collection method of claim 1, wherein the fingerprint procedure comprises at least one of collecting the fingerprint information, performing fingerprint authentication, or completing a process associated with the fingerprint information.

11. A terminal, comprising:
a function key comprising a power control or a volume control;
a fingerprint sensor integrated with the function key;
a processor coupled to the function key and the fingerprint sensor; and
a memory coupled to the processor and configured to store programming instructions that, when executed by the processor, cause the terminal to:
obtain a fingerprint collection instruction, wherein the fingerprint collection instruction instructs the terminal to collect a fingerprint;
set, in response to the fingerprint collection instruction, a function key status of the function key to a locked state;
display a fingerprint collecting indication on a screen of the terminal, wherein the fingerprint collecting indication corresponds to a fingerprint pattern;
collect, using the fingerprint sensor, fingerprint information of a user while the fingerprint collecting indication is displayed on the screen;
obtain a first function key event of the function key;
perform a fingerprint recording process based on the fingerprint information;
display an animation of each status of recording the fingerprint information by the user;
refrain from executing the first function key event when the function key status is the locked state;
set the function key status to an unlocked state after a fingerprint procedure is completed, wherein the fingerprint procedure comprises collecting the fingerprint information; and
execute the first function key event after the function key status is set to the unlocked state.

12. The terminal of claim 11, wherein the instructions, when executed by the processor, cause the terminal to obtain the fingerprint collection instruction in response to detecting that a fingerprint authentication function in a first application is triggered.

13. The terminal of claim 11, wherein the instructions, when executed by the processor, cause the terminal to obtain the fingerprint collection instruction from another terminal.

14. The terminal of claim 11, wherein the instructions, when executed by the processor, cause the terminal to discard a first operation instruction corresponding to the first function key event in response to the function key status being in the locked state.

15. The terminal of claim 11, wherein the instructions, when executed by the processor, cause the terminal to:
determine a priority of the first function key event and a priority of collecting the fingerprint information; and
discard the first function key event when the priority of collecting the fingerprint information is higher than the priority of the first function key event.

16. The terminal of claim 11, wherein the fingerprint procedure further comprises collecting the fingerprint information or performing fingerprint authentication.

17. The terminal of claim 11, wherein the instructions, when executed by the processor, cause the terminal to perform a lock screen operation or a returning to a terminal desktop operation.

18. A computer program product comprising computer-executable instructions stored on a non-transitory computer-readable storage medium that, when executed by a processor, cause a terminal to:
obtain a fingerprint collection instruction, wherein the fingerprint collection instruction instructs the terminal to collect a fingerprint;
set, in response to the fingerprint collection instruction, a function key status of a function key to a locked state;
display a fingerprint collecting indication on a screen of the terminal, wherein the fingerprint collecting indication corresponds to a fingerprint pattern;
collect, using a fingerprint sensor integrated with any function key, fingerprint information of a user while the fingerprint collecting indication is displayed on the screen;
obtain a first function key event of the function key;
perform a fingerprint recording process based on the fingerprint information;
display an animation of each status of recording the fingerprint information by the user;
refrain from executing the first function key event when the function key status is the locked state;

set the function key status to an unlocked state after a fingerprint procedure is completed, wherein the fingerprint procedure comprises collecting the fingerprint information; and execute the first function key event after the function key status is set to the unlocked state.

19. The computer program product of claim 18, wherein the instructions further cause the terminal to obtain the fingerprint collection instruction in response to detecting that a fingerprint authentication function in a first application is triggered.

20. The computer program product of claim 18, wherein the instructions further cause the terminal to store the first function key event while the function key status is the locked state.

* * * * *

UNITED STATES PATENT AND TRADEMARK OFFICE
CERTIFICATE OF CORRECTION

| | | |
|---|---|---|
| PATENT NO. | : 11,928,884 B2 | Page 1 of 1 |
| APPLICATION NO. | : 17/213984 | |
| DATED | : March 12, 2024 | |
| INVENTOR(S) | : Dapeng Zhang, Feipeng Shang and Zhaofeng Li | |

It is certified that error appears in the above-identified patent and that said Letters Patent is hereby corrected as shown below:

On the Title Page

Page 2, (56) References Cited, Foreign Patent Documents: "IN 105898418 8/2016" should read "CN 105898418 8/2016"

Signed and Sealed this
Thirtieth Day of April, 2024

*Katherine Kelly Vidal*

Katherine Kelly Vidal
*Director of the United States Patent and Trademark Office*